United States Patent [19]

Königshofen et al.

[11] 4,444,739
[45] Apr. 24, 1984

[54] PROCESS FOR THE PRODUCTION OF CYANOGEN CHLORIDE FROM HYDROCYANIC ACID AND CHLORINE

[75] Inventors: Heinrich Königshofen, Bergisch-Gladbach; Dieter W. Brück, Cologne; Alfred Nierth, Leverkusen; Marko Zlokarnik; Hans-Jörg Uhlmann, both of Cologne, all of Fed. Rep. of Germany

[73] Assignee: Bayer Aktiengesellschaft, Leverkusen, Fed. Rep. of Germany

[21] Appl. No.: 367,538

[22] Filed: Apr. 12, 1982

[30] Foreign Application Priority Data

Apr. 29, 1981 [DE] Fed. Rep. of Germany ....... 3117054

[51] Int. Cl.³ ............................................. C01B 21/18
[52] U.S. Cl. .................................................. 423/371
[58] Field of Search ................................ 423/371, 383

[56] References Cited

U.S. PATENT DOCUMENTS

| | | | |
|---|---|---|---|
| 3,197,273 | 7/1965 | Trickey | 423/383 |
| 3,592,616 | 7/1971 | Durrell et al. | 423/371 |
| 3,593,494 | 7/1971 | Durrell et al. | 423/383 |
| 3,825,658 | 7/1974 | Eckert et al. | 423/371 |
| 4,162,970 | 7/1979 | Zlokarnik | 210/620 |

FOREIGN PATENT DOCUMENTS 2424305 11/1979 France .

*Primary Examiner*—Edward J. Meros
*Assistant Examiner*—Wayne A. Langel
*Attorney, Agent, or Firm*—Sprung, Horn, Kramer & Woods

[57] ABSTRACT

An improved process for the production of cyanogen chloride is disclosed according to which liquid hydrocyanic acid and gaseous chlorine are reacted in an aqueous medium. The liquid hydrocyanic acid and chlorine are introduced into a column-shaped reactor via at least one two-component nozzle. The reaction mixture is removed at the head of the column-shaped reactor. Preferably, the hydrocyanic acid is in liquid form and the chlorine is in gaseous form. By the process disclosed, quantitative yields of cyanogen chloride are obtained separately from aqueous solutions of hydrochloric acid of a strength suitable for commercial use.

14 Claims, 1 Drawing Figure

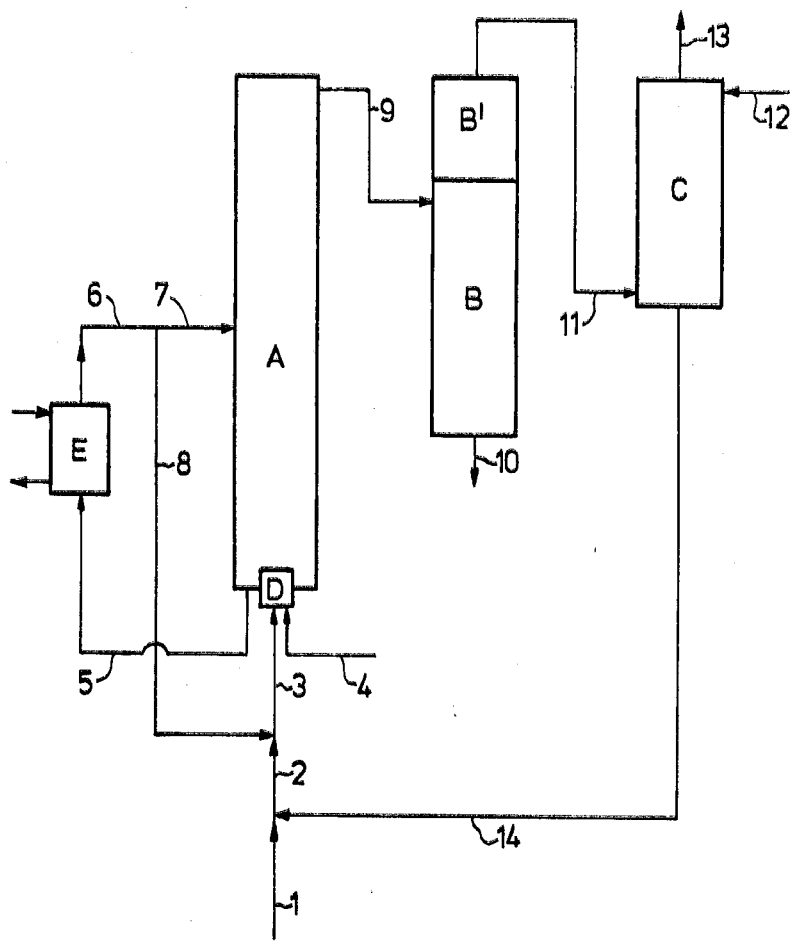

PROCESS FOR THE PRODUCTION OF CYANOGEN CHLORIDE FROM HYDROCYANIC ACID AND CHLORINE

The present invention relates to a process for the continuous production of cyanogen chloride from hydrogen cyanide (hydrocyanic acid) and chlorine in an aqueous medium.

Cyanogen chloride is a known valuable intermediate product, for example for the preparation of cyanuric chloride, which in turn is an intermediate product in the preparation of numerous products, for example pharmaceuticals, herbicides, dyestuffs, brighteners, synthetic resins, plastics, rubbers, explosives and the like (see German Offenlegungsschrift No. 1,667,778). Cyanogen chloride is usually produced from hydrocyanic acid and chlorine in accordance with equation (1):

$$HCN + Cl_2 \rightarrow ClCN + HCl \tag{1}$$

Of the possible ways of carrying out the reaction, in the gas phase, in a condensed phase or in a liquid as a reaction medium, the reaction in an aqueous medium is preferred (see, for example U.S. Pat. No. 3,197,273). When an aqueous medium is used, the procedure consists in passing into approximately the middle of a water-sprayed packed column hydrocyanic acid as a gas, as a liquid or as an aqueous solution and at the same time introducing chlorine gas at a somewhat lower point. Steam is passed into the column from below. The reaction proceeds according to equation (1) and the resulting hydrogen chloride dissolves in the aqueous medium to give hydrochloric acid. By choosing the correct loadings for the various reaction components, for the water and for the steam, the temperature in the column can be controlled in such a manner that cyanogen chloride can be drawn off at the head of the column. In this process the aqueous solution obtained at the bottom of the column is very dilute, containing approximately 2 to 3% by weight hydrochloric acid together with ammonium chloride. Such solution cannot be utilized industrially. In addition this procedure has the further disadvantage that the gas-scrubbing zone, the reaction zone and the gas-stripping zone in the packed column cannot be delimited exactly. It is thus unavoidable that relatively large amounts of the reaction product cyanogen chloride was absorbed in the gas-scrubbing part in addition to hydrocyanic acid and are passed back into the reaction zone or gas-stripping zone. In these regions of the column, the recycling produces a hydrocyanic acid and cyanogen chloride cushion which is constantly subjected to a hydrolysis by the hydrochloric acid present here. In accordance with equations (2) and (3) below, this ultimately leads to the formation of ammonium chloride and hence to a reduction in yield.

$$ClCN + 2 H_2O \xrightarrow{HCl} CO_2 + NH_4Cl \tag{2}$$

$$HCN + 2 H_2O + HCl \longrightarrow HCOOH + NH_4Cl \tag{3}$$

In addition, the cyanogen chloride drawn off at the head of the reaction column contains about 5% of chlorine.

A modification of this procedure is described in U.S. Pat. No. 3,499,737, German Offenlegungsschrift No. 1,667,778 and German Offenlegungsschrift No. 1,667,779. The difference to the process described above is that chlorine is passed in in excess via a glass frit or a packed gas inlet device and that in cyanogen chloride dissolved in the reaction mixture is not driven off at a high temperature with steam, but with gaseous chlorine at temperatures up to 60° C. This procedure does indeed produce a concentrated aqueous hydrochloric acid solution of up to about 20% by weight, but the cyanogen chloride thus obtained contains considerable amounts of chlorine and hydrocyanic acid. Hydrocyanic acid is present because it is passed from above into the reaction mixture. Cyanogen chloride of this type cannot be stored or used for reactions with compounds which can be readily chlorinated or oxidized.

To overcome these problems, German Offenlegungsschrift No. 2,521,580 describes carrying out the reaction of hydrocyanic acid with chlorine in a liquid aqueous medium by using pressures at which all of the chlorine present is completely in solution. For safety and ecological reasons, this procedure can however be realized only with considerable difficulty on a large industrial scale, since leakages cannot be entirely avoided and hence considerable expense is required for safety technology and ecology.

Thus, hitherto there was no process for the production of cyanogen chloride which could be carried out industrially and which was satisfactory at the same time not only in respect of its commercial feasability, for example in respect of its high space-time yields of cyanogen chloride and usable secondary products but also in respect of expense on ecology and safety technology.

SUMMARY

A process has now been found for the production of cyanogen chloride from liquid hydrocyanic acid and gaseous chlorine in an aqueous medium, which is characterized in that liquid hydrocyanic acid and gaseous chloride are fed in to a column-shaped reactor via one or more two-component nozzles and reaction mixture is removed at the head of the column-shaped reactor, and is worked up, such as in a manner which is in itself known, to give gaseous cyanogen chloride, aqueous hydrochloric acid and a wash water which can be recycled and contains cyanogen chloride and, in some instance, hydrocyanic acid.

Possible examples of the liquid hydrocyanic acid which can be used in the process according to the invention are pure liquid hydrocyanic acid and an aqueous solution of hydrocyanic acid of any desired concentration. Suitable examples are hydrocyanic acid and aqueous hydrocyanic acid solutions having a concentration of 10 to 100% by weight. Pure liquid hydrocyanic acid or a commercially available, approximately 20% strength, hydrocyanic acid are preferably used. Possible examples of gaseous chlorine which can be used in the process according to the invention are commercially available chlorine gas and chlorine gas obtained by the evaporation of liquid chlorine.

The process according to the invention can be carried out by passing hydrocyanic acid and chlorine in a stoichiometric ratio, that is to say in equal molar amounts, into the reactor. Since the reaction proceeds virtually quantitatively it is not necessary to employ one of the two reaction components in excess, in order to keep the reaction product virtually free from one of the starting products. However, it is also possible to employ one of the two starting materials in a small excess. In this case the concentration of these components which are used in excess can be used, in the cyanogen chloride produced, as a control value for metering in the other components and cyanogen chloride which is completely free of hydrocyanic acid or chlorine can be obtained. If a small excess of one starting component is to be used, hydrocyanic acid is preferably used in a small excess.

The temperature of the hydrocyanic acid employed and of the chlorine employed is not of particular significance, the only essential features being that the hydrocyanic acid is used in a liquid form and that the chlorine is used in a gaseous form.

It is an essential characteristic of the process according to the invention that the hydrocyanic acid and the chlorine are passed into the reactor via one or more two-component nozzles. Examples of suitable types of two-component nozzles are injector nozzles, ejector nozzles and venturi nozzles. Injector nozzles are preferably employed, particularly preferably those having a slot-shaped exit cross-section, as described, for example, in German Offenlegungsschrift No. 2,634,494 and its U.S. counterpart U.S. Pat. No. 4,162,970, the disclosures of which are hereby incorporated herein by reference. The nozzles can in general be located at any desired place in the reactor. When injector nozzles are used these are preferably located at the bottom of the reactor.

The nozzles are supplied with gaseous chlorine as the gas phase and hydrocyanic acid as the liquid phase. If the gas-liquid ratio of the starting components does not permit optimum working of the two-component nozzles, they can be supplied with further liquid, for example with the reaction mixture from the reactor and/or wash water from the working-up of the reaction mixture.

The number of the two-component nozzles depends on the type of nozzles, the throughput of gas and liquid desired, the amount of cyanogen chloride desired and the desired concentration of the resulting hydrochloric acid. In general, one or more two-component nozzles can be used.

The two-component nozzles are preferably located at the bottom of the column-shaped reactor. They effect a considerable enlargement of the mass transfer area between the liquid and the gas, since the gas is brought into a considerably finer state of division than would be the case with the use of frits or other gas feed-in devices hitherto customary for the reaction. This means that relatively high concentrations of cyanogen chloride and hydrochloric acid, which hitherto have been consciously avoided in order to suppress the hydrolysis reactions (see equations (2) and (3)) which lead to the formation of undesired secondary products, are possible in the reactor. Surprisingly, such hydrolysis reactions occur in the process according to the invention to a much smaller extent than in the previously known processes.

The column-shaped reactor is preferably in the form of a bubble column. Preferably, the reactor is subdivided, along its height, by sieve plates into several stages, the number of which is determined by the desired narrowing-down of the residence time.

The heat of reaction can be dissipated in any desired way, for example by internal or external coolers. In a preferred embodiment of the process according to the invention, reaction mixture is removed in the lower region of the reactor, preferably at the bottom of the reactor, passed via a cooler, which works, for example with cooling water, and is returned to the reactor by feeding-in higher up. This feeding-in is preferably effected in such a manner that a product flow results above the feeding-in point into the reactor, which flow corresponds to the throughput desired. If the reactor used is a bubble column having sieve plates, the feeding-in point for the cooled reaction mixture is, for example, below the top sieve plate, preferably below the lowest sieve plate. Preferably the cooled reaction mixture is returned to the reactor in a free space for reaction over which sieve plates are disposed. These measures have the effect of dissipating the heat generated in the reaction and of slowing down the upward flow, generated by the two-component nozzles, of liquid and gas bubbles, when the nozzles are located at the bottom of the reactor. The reactor can be divided by sieve plates into segments of equal size. However, the sieve plates can also be arranged in such a manner that the distance between the bottom of the reactor and the lowest sieve plate is larger than the distance between the individual sieve plates.

If in order to achieve optimum working of the two-component nozzles it is desirable to supply these with more liquid than is provided by the liquid hydrocyanic acid to be employed, some of the circulating reaction mixture can be withdrawn at a point between the cooler and the feeding-in point into the reactor and be supplied to the two-component nozzles as a liquid phase in addition to the liquid hydrocyanic acid.

The temperature in the reactor is preferably adjusted so that some of the cyanogen chloride formed escapes as a gas from the liquid phase in the upper part of the reactor. Examples of suitable temperatures are 15° to 60° C. The reactor is preferably used at 30° to 40° C.

The process according to the invention can be carried out, for example, without pressure or under a slightly elevated pressure, which is essentially determined by the following units. The pressure at the head of the reactor can be, for example in the range from 1 to 2.5 bars absolute. The pressure at the head of the reactor is preferably in the range from 1 to 1.5 bars absolute, particularly preferably in the range from 1 to 1.45 bars absolute. In principle, even higher pressures can be used, but for ecological and safety-technological reasons this is not advantageous. In contrast to the mode of operation, described as disadvantageous in German Offenlegungsschrift No. 2,521,580, under low pressures, for example under a back pressure of 1.3 bars absolute, even a virtually pressureless mode of operation of the process according to the invention, for example under a back pressure of 1.1 bars absolute, leads to a conversion of almost 100% being achieved.

The gas-liquid mixture leaving at the head of the reactor is worked up by a method which is in itself known to give gaseous cyanogen chloride, aqueous hydrochloric acid and a wash water which can be recycled. An example of a unit suitable for this working-up procedure is a washer-stripper combination.

It is very surprising that conversions of virtually 100% are achieved under low pressures in a gaseous-liquid phase in the process according to the invention. German Offenlegungsschrift No. 2,521,580 had led to the expectation that only incomplete conversions could be achieved under low pressures when working in a gaseous-liquid phase.

Compared with previously known processes in a gaseous-liquid phase, for example in accordance with German Offenlegungsschrift No. 1,667,779, the advantages of the process according to the invention are that in addition to a chlorine-free cyanogen chloride a concentrated solution of hydrochloric acid, for example a 10 to 15% strength solution of hydrochloric acid, can be obtained which is virtually free from ammonium chloride.

Another advantage, for economic and ecologic reasons, compared with the state of the art is that the procedure according to the invention can be carried out under no pressure or under an only slightly elevated pressure.

BRIEF DESCRIPTION OF DRAWING

A particularly preferred embodiment of the process according to the invention is explained below in conjunction with the sole FIGURE.

DESCRIPTION OF SPECIAL EMBODIMENT

Hydrocyanic acid, preferably in the form of a highly concentrated aqueous solution or as pure liquid hydrocyanic acid, is passed through the lines 1, 2 and 3 to the bubble column A via the two-component nozzles D. Gaseous chlorine is also passed to the bubble column A through the line 4 via the two-component nozzles D. A part of the reaction mixture is removed at the bottom from the column A and passed via the line 5 through the cooler E, cooled with cooling water, in order to remove the heat generated in the reaction. The stream 6 leaving the cooler E is divided into stream 7 and stream 8. Stream 8 is passed via the line 3 to the two-component nozzles D and its rate is adjusted so that an optimum gas-liquid ratio (stream 4 to stream 3) is achieved in the two-component nozzles. The part of the stream 6, leaving the cooler E, which is not passed back to the two-component nozzles is passed into the mid-range of the bubble column A via the line 7. A reaction mixture is removed at the head of the bubble column A via the line 9. The stream contains cyanogen chloride (most of it gaseous), aqueous hydrochloric acid and small amounts of hydrocyanic acid and it is passed to the stripper B, which is preferably equipped with a splash guard (B'). The stripper B is provided at the bottom with an evaporator, which is heated in such a manner that the cyanogen chloride still present in a dissolved form in the stream 9 is evaporated and the hydrochloric acid flowing away via the line 10 is free from cyanogen chloride and hydrocyanic acid. The gaseous cyanogen chloride which is free from hydrochloric acid but can still contain small amounts of hydrocyanic acid is removed from the stripper B via the line 11 and passed to the washer C, which is supplied with wash water via the line 12. The line 14 removes the wash water, which contains cyanogen chloride and hydrocyanic acid and which is passed to the two-component nozzles D via the lines 2 and 3. Virtually pure gaseous cyanogen chloride is removed from the washer via the line 13.

EXAMPLES

In the examples, the procedure of the particularly preferred embodiment, described above, of the process according to the invention was followed. The reference numbers and reference letters refer to the FIGURE.

EXAMPLE 1

The bubble column reactor A had been sub-divided into 3 chambers by 2 sieve plates and had been equipped with an injector nozzle corresponding to German Offenlegungsschrift No. 2,634,494 and U.S. Pat. No. 4,162,970. The reactor capacity was ⅓ of the hourly throughput. Before the start of the reaction, the reactor was filled with water. Thereafter 38 kg per hour of pure liquid hydrocyanic acid were supplied via the line 1 and 100 kg per hour of gaseous chlorine were supplied via the line 4. After constant process conditions had been achieved the following reactor characteristics were determined:

Pressure at the reactor head: 1.25 bars (absolute)
Temperature in the lowest chamber: 36° C.
Temperature in the streams 6, 7 and 8: 18° C.
Temperature at the reactor outlet: 26° C.
Circulation rate of the stream 5: 21 times the reactor capacity
Circulation rate of the stream 8: 9 times the reactor capacity The reaction mixture leaving the reactor A (stream 9) was passed into the degassing column B, which was maintained via an evaporator at a temperature of 30° to 40° C. at the inlet point. The bottom temperature was 101° C.

At the bottom of degassing column B 806 kg/h of aqueous, 6.36% by weight hydrochloric acid, which contained 31 ppm of $NH_3$ and about 1 ppm of HCN, were removed as the stream 10. The gaseous cyanogen chloride was passed via the line 11 into a washer, which was fed with 755 kg/h of water through the line 12. 85 kg/h of cyanogen chloride having a hydrocyanic acid content of 0.01% by weight and a chlorine content of 0.06% by weight was removed from the washer C via the line 13. The wash water from the washer D was recycled into the reactor A via the lines 14, 2 and 3.

EXAMPLE 2

The procedure of Example 1 was followed, but 193 kg/h of aqueous hydrocyanic acid corresponding to 38 kg of pure hydrocyanic acid were fed in via the line 1 and 600 kg/h of wash water were fed in via the line 12. The characteristic values of the reactor were as indicated in Example 1. Via line 10, 800 kg/h of aqueous, 6.3% by weight hydrochloric acid were obtained, which contained 45 ppm of $NH_3$ and about 1 ppm of HCN. The cyanogen chloride yield was 85 kg/h (line 13). The cyanogen chloride contained 0.02% by weight of hydrocyanic acid and 0.05% by weight of chlorine.

EXAMPLE 3

57 kg/h of pure hydrocyanic acid via the line 1, 150 kg/h of gaseous chlorine via the line 4 and 940 kg/h of wash water via the line 12 were fed into the same apparatus as in Example 1.

After constant process conditions had been achieved, a pressure at the reactor head of 1.4 bars (absolute) was established. The temperature in the lowest chamber of the reactor was 35° C. and the other characteristic values of the reactor were as indicated in Example 1.

Via the line 10, 1,017 kg/h of aqueous, 7.6% strength by weight hydrochloric acid were removed, which contained 41 ppm of $NH_3$ and less than 1 ppm of hydrocyanic acid. The cyanogen chloride yield was 129.6 kg/h (stream 13). The cyanogen chloride contained 0.07% by weight of chlorine and 0.09% by weight of HCN.

EXAMPLE 4

The procedure of Example 3 was followed, but only 470 kg/h of wash water were added via the line 12. After constant process conditions had been achieved, the pressure at the reactor head was 1.1 bars (absolute), the temperature in the lowest chamber of the reactor was 32° C. and the temperature at the reactor outlet was 28° C. The other characteristic reactor values were as indicated in Example 1.

Via line 10 547 kg/h of aqueous, 14.0% strength by weight hydrochloric acid were removed, which contained 85 ppm of $NH_3$ and less than 1 ppm of hydrocyanic acid. The cyanogen chloride yield was 129.5 kg/h (stream 13). The cyanogen chloride contained 0.05% by weight of chlorine and 0.1% by weight of hydrocyanic acid.

What is claimed is:

1. In a process for the production of cyanogen chloride by contacting hydrocyanic acid and chlorine in an aqueous medium, the improvement wherein liquid hydrocyanic acid and gaseous chlorine are fed into a bubble column via at least one two component nozzle concurrently with water and the reaction mixture comprising cyanogen chloride, hydrochloric acid and water is removed from the head of said bubble column and worked up to separate therefrom gaseous cyanogen chloride and aqueous hydrochloric acid.

2. A process according to claim 1, wherein the reaction mixture is worked up by feeding the same into a stripping column to separate therefrom a gaseous cyanogen chloride containing stream and to withdraw from the bottom of the stripping column an aqueous hydrochloric acid solution.

3. A process according to claim 1, wherein said working up comprises feeding components of the reaction mixture to a washing zone and passing the gaseous components in counter-current to wash water, withdrawing wash water from the bottom of the washing zone and purified gas from the top of the wash zone.

4. A process according to claim 3 wherein said wash water is recycled to said bubble column.

5. A process according to claim 2, wherein the gaseous components withdrawn from said stripping column are introduced into a washing column and passed in counter-current to wash water introduced therein, wash water is withdrawn from the bottom of the column and purified gaseous components are withdrawn from the top of the washing column.

6. A process according to claim 1, wherein at least one of the two-component nozzles employed is one having a slot-shaped exit cross-section.

7. A process according to claim 1 wherein the reaction mixture is removed from the lower part of the bubble column, passed through a cooler and returned to the bubble column at a point high up.

8. A process according to claim 7 wherein the cooled reaction mixture is returned to the bubble column in a free space for reaction over which sieve plates are disposed.

9. A process according to claim 7 wherein part of the circulating reaction mixture withdrawn from the lower part of the bubble column and passed through the cooler to be inserted at a point higher up in the bubble column is removed between the cooler and the point of higher introduction and passed to a two-component nozzle as a liquid phase and introduced into the bubble column together with hydrocyanic acid.

10. A process according to claim 1, wherein the temperature of the hydrocyanic acid employed and the temperature of the chlorine employed is such that the hydrocyanic acid employed is in the liquid form and the chlorine is in a gaseous state.

11. A process according to claim 1, wherein the pressure at the head of the bubble column is in the range from 1 to 2.5 bars absolute.

12. A process according to claim 10, wherein the temperature in the bubble column is 15° to 60° C.

13. A process according to claim 1, wherein the bubble column contains sieve plates.

14. A process according to claim 1 wherein the entire reaction mixture is removed from the head of said bubble column.

* * * * *